Patented Feb. 26, 1952

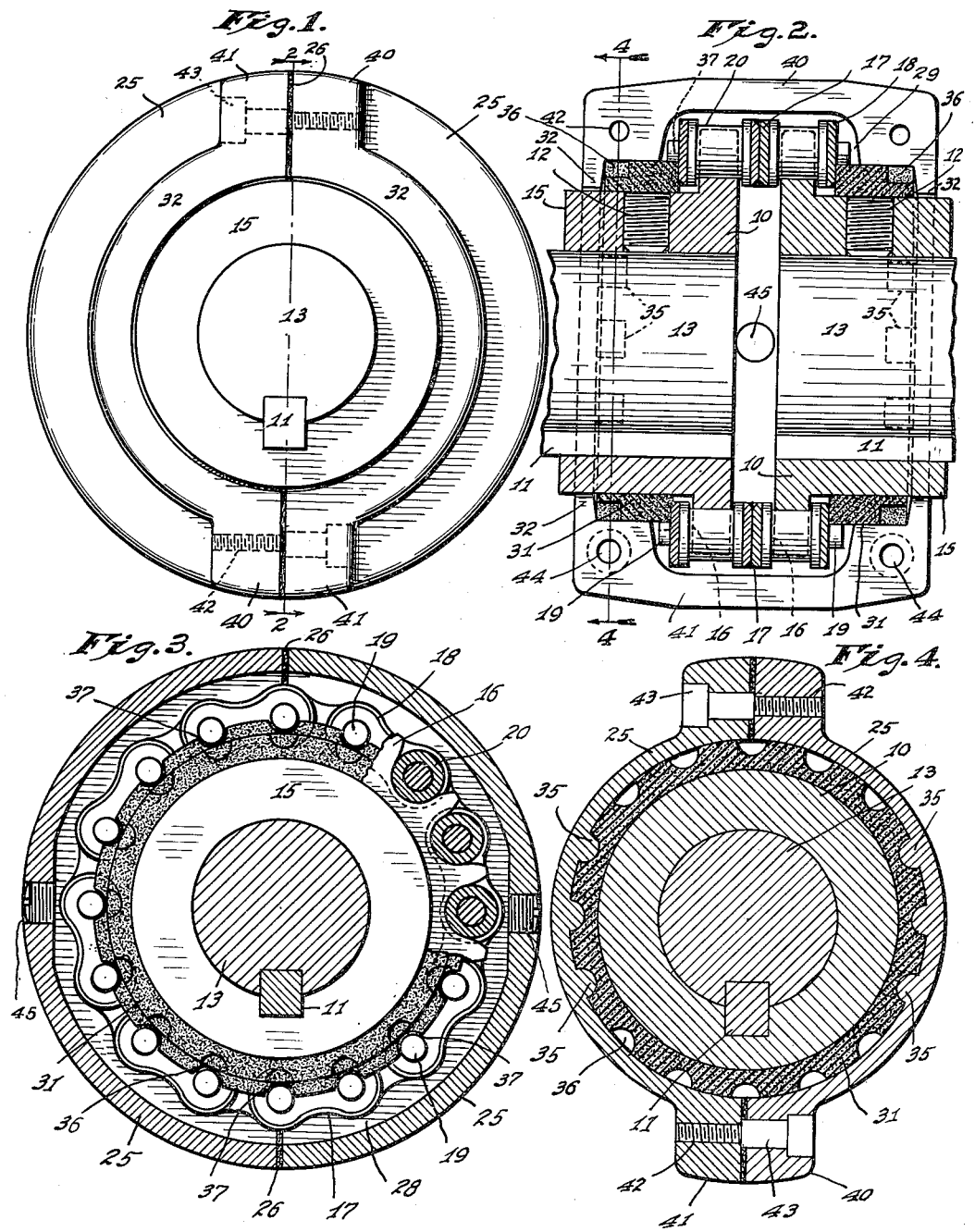

2,587,365

UNITED STATES PATENT OFFICE 2,587,365

FLEXIBLE COUPLING HOUSING

George G. Mize, Indianapolis, Ind., assignor to Diamond Chain Company, Inc., Indianapolis, Ind., a corporation of Indiana Application June 14, 1949, Serial No. 99,013

4 Claims. (Cl. 64—19)

My invention relates to flexible couplings for operatively interconnecting two approximately aligned shafts and more particularly to the construction of a housing for enclosing such a coupling. My invention is especially concerned with, but not necessarily limited to, that type of flexible coupling in which sprockets mounted on the adjacent ends of the shafts to be coupled are interconnected by an endless chain.

The production of a suitable housing for a coupling of the type referred to has in the past presented several problems. In the first place, it is desirable that the housing and the coupling members constitute an effectively sealed unit in order that the housing may contain a supply of lubricant without danger of leakage; and such sealing of the housing presents some difficulties in view of the fact that the housing must enclose members whose condition of alignment will vary in service. In the second place, it is desirable that the housing be operatively connected to some element of the coupling so as to insure its rotation therewith; and the provision of such a connection, in view of changing conditions of alignment, also presents difficulties.

It has heretofore been proposed to provide a coupling-housing with compressible sealing rings which engage both the housing and hubs of the coupling members to prevent the escape of lubricant from the interior of the housing; and in order to drive the housing, it has been proposed to provide it with a rigid projection in the form of a lug or ear which engages a coupling member or a chain interconnecting the two coupling members in such a way as to insure rotation of the housing with the coupling. Because of the possibility of misalignment, the surface or surfaces of such projection which engage the coupling member or chain must be of limited extent; and as a result, areas of contact are limited and wear is relatively rapid.

It is therefore an object of this invention to provide a coupling-housing which will be positively connected to the coupling in a rotational sense, which will possess an adequate seal preventing the escape of lubricant, and which will at the same time accommodate itself to changing conditions in the alignment of the shafts which the coupling interconnects.

The accompanying drawing illustrates my invention: Fig. 1 is an end elevation of an assembled coupling; Fig. 2 is an axial section on the line 2—2 of Fig. 1; Fig. 3 is an end elevation of the coupling with the housing shown in section; and Fig. 4 is a transverse section on the line 4—4 of Fig. 2.

The coupling shown in the drawing comprises a pair of coupling members 10 adapted to be secured, as by means of keys 11 and set screws 12, to the adjacent ends of two approximately aligned shafts 13. Each of the coupling members comprises a cylindrical hub portion 15 and an annular series of sprocket teeth 16 provided on the adjacent ends of such hub portions. Cooperating with the sprocket teeth 16 is an endless chain 17 through which the two sprockets are operatively interconnected. The chain shown is a double-width chain comprising side plates 18, transverse pins 19 the ends of which project beyond the side plates, and rollers 20 which are rotatably supported on the pins 19 and received in the spaces between the sprocket teeth 16. The coupling described is of known type.

A coupling-housing embodying my invention is desirably divided axially to permit its application to and removal from the assembly of the coupling and interconnected shafts. As shown in the drawing, the housing comprises two similar halves 25 which, when disposed about the coupling and secured together with interposed gaskets 26, form a substantially complete enclosure for the coupling. Centrally, the interior of the housing is large enough to receive the chain with considerable clearance, both over the chain side-plates, as indicated at 28 in Fig. 3 and over the ends of the chain pins, as indicated at 29 in Fig. 2. Axially beyond the ends of the chain pins, the interior of the housing has at each end a portion of reduced diameter for the reception of an oil-seal ring 31; and beyond the outer end of each oil seal ring the housing is provided with an inwardly directed annular flange 32. The internal diameter of the flange 32 is somewhat greater than the outer diameter of the hub 15 which it surrounds in order to provide clearance permitting limited misalignment of the two shafts 13. Those portions of the housing which receive the oil-seal rings 31 are of such diameter that the oil-seal rings will be radially compressed between the housing and the coupling hubs 15 when the housing is in place.

The oil-seal rings are desirably formed of some synthetic rubber or other compressible material resistant to the action of oil and other lubricant. Because of the clearance provided between the interior of the housing and the chain and between the flanges 32 and the hubs 15 of the coupling members, the coupling-housing is supported entirely through the oil-seal rings; and as such rings are radially compressed an effective seal is provided preventing the escape of lubricant from within the housing.

A characteristic feature of my invention is the employment of the oil-seal rings to effect a positive driving connection between the coupling and its enclosing housing. To this end, each ring-receiving portion of the housing is provided with one or more angularly spaced bosses 35 adapted to be received in grooves 36 formed in the outer face of the adjacent oil-seal ring 31. At its inner end, each of the oil-seal rings 31 is provided with an annular series of notches 37 proportioned and spaced to receive the projecting ends of the chain-pins 19. The chain-pins 19 and the notches 37 which receive them provide a positive driving connection between the coupling and the oil-seal rings; while the bosses 35 on the housing and the notches 36 on the oil seal rings provide a positive driving connection between the rings and the housing. While this connection is described as positive, it is to be understood that the resilience of the oil seal rings provides a cushioning action which contributes to silence in operation.

For manufacturing reasons, the two housing-halves 25 are desirably identical. Each is formed with diametrically opposite flanges 40 and 41 one of which, shown as the flange 40, is provided with a pair of tapped holes 42 for the reception of the threaded ends of clamp screws 43, while the other flange 41 is provided with a pair of holes 44 in which clamp screws 43 are freely receivable. The holes 42 and 44 are so arranged that when the casing-halves 25 are brought together with the flange 40 of each opposed to the flange 41 of the other, the clamp screws 43 may be passed through the holes 44 in the flanges 41 and into the screw-threaded holes 42 in the flanges 40. The screws 43 are desirably shouldered to limit compression of the gaskets 26 and consequent reduction of the clearance between the housing and the coupling.

To provide for the introduction of lubricant to the interior of the housing, either or both housing-halves may be provided with a tapped hole closed by a removable, screw-threaded plug 45.

It will be noted from the drawing that the number of notches 37 in each of the resilient rings 31 is equal to the number of chain pins 19, so that each chain pin will be received in a notch of the ring. Because each casing-half 25 must be applied to the coupling by generally radial movement, the bosses 35 are limited in number and confined to that region of the housing adjacent the ends of the diameter perpendicular to the plane of the gasket 26. Although the bosses are limited in number and confined to a region of limited circumferential extent, the boss-receiving notches 36 in each ring 31 desirably form a continuous annular series in order to facilitate application of the housing to the coupling. The provision of a pin-receiving notch 37 for each of the chain pins 19 and the provision of a plurality of the bosses 35, affords a plurality of generally radially extending surfaces over which torque is transmitted between each ring 31 and the elements of the coupling. Because of the resilient nature of the rings 31, the application of torque at a plurality of angularly spaced points distributes the load, lessens the stresses introduced into the rings 31, and decreases the chance that either ring will fail under the stresses imposed upon it.

I claim as my invention:

1. In combination with a flexible coupling having a pair of operatively interconnected coupling members adapted for respective connection to two approximately aligned shafts, a housing enclosing said coupling and provided with aligned openings, rings of resilient material in sealing engagement with the coupling members and housing, said coupling and each of said rings having intermeshing tooth-like projections providing a positive driving connection between the coupling and rings, said housing and each of said rings having intermeshing tooth-like projections providing a positive driving connection between the housing and the rings.

2. In combination with a flexible coupling comprising a pair of coupling members adapted for respective connection to two approximately aligned shafts, each of said members having a hub and an annular series of sprocket teeth, and an endless chain cooperating with said sprocket teeth and drivingly interconnecting the coupling members; a housing enclosing said coupling and provided with aligned openings loosely receiving said hubs, rings of resilient material in sealing engagement with the hubs and housing, said chain and each of said rings having intermeshing tooth-like projections providing a positive driving connection between the chain and rings, and said housing and each of said rings having intermeshing tooth-like projections providing positive driving connection between the housing and the rings.

3. The invention set forth in claim 1, wherein the intermeshing tooth-like projections providing the positive-driving connection between the housing and rings comprise an annular series of spaced notches in each ring and bosses on the housing intermeshing with the notches.

4. The invention set forth in claim 2, wherein the intermeshing tooth-like projections providing the positive-driving connection between the chain and rings comprise the projecting ends of an annular series of transverse pins forming parts of said chain and recesses in each ring receiving such projecting pin-ends.

GEORGE G. MIZE.

REFERENCES CITED

The following references are of record in the file of this patent:

UNITED STATES PATENTS

| Number | Name | Date |
| --- | --- | --- |
| 1,854,667 | Ragan | Apr. 19, 1932 |
| 2,045,565 | Belcher | June 30, 1936 |
| 2,473,618 | Stillwagon, Jr. | June 21, 1949 |